(12) United States Patent
Peng et al.

(10) Patent No.: US 11,707,152 B2
(45) Date of Patent: Jul. 25, 2023

(54) FLOAT VALVE MOTION DETECTION DEVICE, POT COVER ASSEMBLY AND PRESSURE COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Feng Peng, Foshan (CN); Fan Zhang, Foshan (CN)

(*) Notice: Subject to any disclaimer, the term of this patent is extended or adjusted under 35 U.S.C. 154(b) by 685 days.

(21) Appl. No.: 16/483,741

(22) PCT Filed: Nov. 1, 2017

(86) PCT No.: PCT/CN2017/108986
§ 371 (c)(1),
(2) Date: Aug. 5, 2019

(87) PCT Pub. No.: WO2018/145491
PCT Pub. Date: Aug. 16, 2018

(65) Prior Publication Data
US 2020/0187698 A1 Jun. 18, 2020

(30) Foreign Application Priority Data

Feb. 10, 2017 (CN) .......................... 201720121908.7
Feb. 10, 2017 (CN) .......................... 201720121912.3

(51) Int. Cl.
*A47J 27/08* (2006.01)
*A47J 27/09* (2006.01)
(Continued)

(52) U.S. Cl.
CPC ........... *A47J 27/0802* (2013.01); *A47J 27/09* (2013.01); *A47J 27/004* (2013.01); *A47J 27/086* (2013.01); *A47J 27/56* (2013.01)

(58) Field of Classification Search
None
See application file for complete search history.

(56) References Cited

FOREIGN PATENT DOCUMENTS

| CN | 201016827 Y | 2/2008 |
| CN | 101240857 A * | 8/2008 ............... F16K 3/32 |

(Continued)

OTHER PUBLICATIONS

Machine translation of CN 203789698 U performed on Mar. 10, 2022, Feng et al. (Year: 2014).*

(Continued)

*Primary Examiner* — Brian W Jennison
*Assistant Examiner* — Kevin Guanhua Wen
(74) *Attorney, Agent, or Firm* — Kilpatrick Townsend & Stockton, LLP

(57) ABSTRACT

The present disclosure provides a float valve motion detection device, a pot cover assembly and a pressure cooking appliance, the float valve motion detection device comprising: a float valve, a hollow inductance coil and a detection circuit. A valve core of the float valve is made of materials having permeability unequal to that of air. When the valve core is pushed by the pressure in a pot from a first position to a second position, the volume of the valve core in the hollow inductance coil changes, which changes the inductance of the hollow inductance coil. A detection circuit determines the position of the valve core by means of detecting the change in the inductance of the hollow inductance coil so as to determine whether it is safe to uncover at the current time.

16 Claims, 7 Drawing Sheets

A-A

(51) Int. Cl.
*A47J 27/00* (2006.01)
*A47J 27/086* (2006.01)
*A47J 27/56* (2006.01)

(56) References Cited

FOREIGN PATENT DOCUMENTS

| CN | 102727076 A | * | 10/2012 | ............. | A47J 27/09 |
|----|-------------|---|---------|---------------|------------|
| CN | 203789698 U | * | 8/2014  | ............. | A47J 27/09 |
| CN | 104939666 A |   | 9/2015  |               |            |
| CN | 204985944 U | * | 1/2016  | ............. | F16K 31/06 |
| CN | 205090059 U |   | 3/2016  |               |            |
| CN | 105902149 A | * | 8/2016  | ............. | A47J 27/09 |
| CN | 105996750 A |   | 10/2016 |               |            |
| CN | 106618172 A |   | 5/2017  |               |            |
| EP | 0587532 A1  |   | 3/1994  |               |            |
| FR | 2468808 B1  |   | 6/1983  |               |            |
| KR | 950009949 B1 | * | 9/1995 | ............. | A47J 27/09 |
| KR | 20080085417 A | * | 9/2008 | ............ | A47J 27/002 |
| WO | 2016070896 A1 |  | 5/2016 |               |            |

OTHER PUBLICATIONS

Machine translation of KR 20080085417 A performed on Mar. 10, 2022, Im (Year: 2008).*
Machine translation of CN 105902149 A performed on Mar. 10, 2022, Zhang et al. (Year: 2016).*
Machine translation of KR 950009949 B1 performed on Mar. 10, 2022, Choe (Year: 1995).*
Machine translation of CN 102727076 A performed on Jun. 21, 2022, Cai et al. (Year: 2012).*
Machine translation of CN 101240857 A performed on Aug. 30, 2022, Yan et al. (Year: 2008).*
Machine translation of CN 204985944 U performed on Oct. 25, 2022, Mao (Year: 2016).*
Extended European search report of EP Application No. 17895598.5.
First Search Report of Chinese Application No. 2017111302530.
First Office Action dated Aug. 30, 2019 corresponding to CN application No. 201711130253.0.

* cited by examiner

FLOAT VALVE MOTION DETECTION DEVICE, POT COVER ASSEMBLY AND PRESSURE COOKING APPLIANCE

PRIORITY CLAIM AND RELATED APPLICATION

The present disclosure is a national phase application of International Application No. PCT/CN2017/108986, filed on Nov. 1, 2017, which claims the priority of Chinese Application No. 201720121912.3, filed in the Chinese Patent Office on Feb. 10, 2017, and claims the priority of Chinese Application No. 201720121908.7, filed in the Chinese Patent Office on Feb. 10, 2017, the entireties of which are herein incorporated by reference.

FIELD

The present disclosure relates to the field of cooking appliance, in particular, to a float valve motion detection device, a pot cover assembly having the float valve motion detection device, and a pressure cooking appliance having the pot cover assembly.

BACKGROUND

After a pressure cooking appliance has finished cooking the food, if the pressure in a pot exceeds the safe range, the hot steam of high temperature ejected from the pot % ill damage the user when the cover is opened. In order to detect whether the pressure in the pot is reduced to the safe range, generally, the upper cover part of the pressure cooking appliance is installed with a float valve. When the valve core is lifted by the pressure in the pot, that is, when the pressure in the product is too high, the cover of the product cannot be opened safely. Conversely, when the valve core is in the non-lifted state, that is, the pressure in the pot has been reduced to the safe range, the cover of the product can be safely opened.

In the old product design scheme, a hollow inductance coil is designed to be above the valve core of the float valve, and an upper end of the valve core has a segment of magnetically conductive materials. When the valve core is lifted by the pressure in the pot, the magnetically conductive materials are inserted into the center of the hollow inductance coil such that the inductance of the hollow inductance coil is increased, the detection circuit converts the change of the inductance into an electric signal, and outputs a photoelectric signal or sound according to the electric signal to remind the user that the pot cover cannot be opened. When the pressure in the pot falls to the safe range, the valve core automatically falls, the magnetically conductive materials are detached from the center of the hollow inductance coil, and the inductance of the hollow inductance coil decreases. The detection circuit converts the signal into an electric signal, and outputs a photoelectric signal or sound to prompt the user to open the pot cover safely.

In this solution, it is necessary to fix the magnetically conductive materials on the upper end of the valve core. Therefore, before the assembling, a groove needs to be processed on the top of the valve core, and a segment of the magnetically conductive materials is processed. Then, the processed magnetically conductive materials are pressed and fixed in the groove by the tooling. This solution requires increasing processing procedures and parts (magnetically conductive materials), therefore, the overall cost of the float valve assembly is high. In today of increasingly fierce market competition, reducing production cost and improving production efficiency is one of the most effective ways for an enterprise to remain invincible. Therefore, the old product solution could be improved greatly.

SUMMARY

One embodiment of the present disclosure is to provide a float valve motion detection device having low cost.

Another embodiment of the present disclosure is to provide a pot cover assembly including the float valve motion detection device as described above.

In yet another embodiment of the present disclosure is to provide a pressure cooking appliance including the pot cover assembly as described above.

Embodiments of the present disclosure provides a float valve motion detection device for a pressure cooking appliance, comprising: a float valve, a hollow inductance coil and a detection circuit, the float valve comprising a valve core made of materials having permeability unequal to that of air, the valve core being movably mounted on an upper cover of the pressure cooking appliance, the valve core being pushed from a first position to a second position by the pressure in a pot of the pressure cooking appliance; the detection circuit being electrically connecting with the hollow inductance coil, for detecting a change in inductance of the hollow inductance coil, and determining the position of the valve core according to the change in inductance; and the volume of the valve core in the hollow inductance coil when the valve core is at the first position is less than or greater than the volume of the valve core in the hollow inductance coil when the valve core is at the second position.

In one embodiment, the valve core of the float valve is made of materials having permeability unequal to that of air. When the pressure in the pot of the pressure cooking appliance exceeds a safe range, the valve core is pushed by the pressure in the pot from a first position to a second position, and the volume of the valve core in the hollow inductance coil changes, which changes the inductance of the hollow inductance coil. The detection circuit determines the position of the valve core by means of detecting the change in the inductance of the hollow inductance coil so as to determine whether it is safe to uncover at the current time. Changing the structure of the valve core of the float valve and fabricating the valve core using materials having permeability unequal to that of air removes the magnetically conductive materials in the old solution from the valve core, which not only saves on production materials, but also omits the processing procedures for the magnetically conductive materials and the magnetically conductive material mounting part on the valve core as well as the assembling procedures for the magnetically conductive materials and the valve core, thereby reducing production cost and improving production efficiency. This enables enterprises to gain an advantage in industry competition.

According to an embodiment of the present disclosure, the hollow inductance coil is fixedly mounted on the upper cover, the hollow inductance coil is at least partially located above the valve core when the valve core is at the first position, and the volume of the valve core in the hollow inductance coil increases when the valve core is pushed to the second position by the pressure in the pot.

In one embodiment, when the valve core is at the first position, the hollow inductance coil is at least partially located above the valve core, and when the valve core is pushed by the pressure in the pot to the second position, the volume of the valve core in the hollow inductance coil increases. Since the permeability of materials of the valve core is unequal to that of air, the inductance of the hollow inductance coil is changed. In one embodiment, if the permeability of the materials of the valve core is less than that of air, the inductance of the hollow inductance coil would decrease. If the permeability of the materials of the valve core is greater than that of air, the inductance of the hollow inductance coil would increase. When the detection circuit detects that the amount of increase or decrease of the inductance of the hollow inductance coil reaches the corresponding preset value, the valve core is determined to be pushed by the pressure in the pot to the second position, thereby determining that the pressure in the pot exceeds the safety range and it is unsafe to uncover at the current time. After the pressure in the pot falls to the safe range, the valve core automatically falls back to the first position, and the volume of the valve core in the hollow inductance coil is reduced. If the permeability of the materials of the valve core is less than that of air, the inductance of the hollow inductance coil increases. If the permeability of the materials of the valve core is greater than that of air, the inductance of the hollow inductance coil decreases. When the detection circuit detects that the amount of increase or decrease of the inductance of the hollow inductance coil reaches the corresponding preset value, the valve core is determined to fall back to the first position, thereby determining that the pressure in the pot falls to the safe range and it is safe to uncover at the current time.

According to an embodiment of the present disclosure, the hollow inductance coil is fixedly mounted on the upper cover, the valve core is at least partially located in the hollow inductance coil when the valve core is at the first position, and the volume of the valve core in the hollow inductance coil increases when the valve core is pushed to the second position by the pressure in the pot.

In one embodiment, when the valve core is at the first position, the valve core is at least partially located in the hollow inductance coil, and when the valve core is pushed to the second position by the pressure in the pot, the portion of the valve core located at the center of the hollow inductance coil is wholly or partially disengaged from the hollow inductance coil, which decreases the volume of the valve core in the hollow inductance coil. The permeability of the materials of the valve core is unequal to that of air, which changes the inductance of the hollow inductance coil. In one embodiment, if the permeability of the materials of the valve core is less than that of air, the inductance of the hollow inductance coil increases. If the permeability of the valve core material is greater than that of air, the inductance of the hollow inductance coil decreases. When the detection circuit detects that the amount of increase or decrease of the inductance of the hollow inductance coil reaches the corresponding preset value, the valve core is determined to be pushed to the second position by the pressure in the pot, thereby determining that the pressure in the pot exceeds the safe range and it is unsafe to uncover at the current time. After the pressure in the pot falls within the safe range, the valve core automatically falls back to the first position, and the volume of the valve core in the hollow inductance coil increases. If the permeability of the materials of the valve core is less than that of air, the inductance of the hollow inductance coil decreases, and if the permeability of the materials of the valve core is greater than that of air, the inductance of the hollow inductance coil increases. When the detection circuit detects that the amount of increase or decrease of the inductance of the hollow inductance coil reaches the corresponding preset value, the valve core is determined to have fallen back to the first position, thereby determining that the pressure in the pot falls to the safe range and it is safe to uncover at the current time.

In one embodiment, the valve core is made of aluminum. The permeability of aluminum is less than that of air, and its density is small. The valve core is made of aluminum as the production material, which can avoid the excessive weight of the valve core and ensure that the weight of the parts meets the design requirements, so as to prevent the issue that the pressure in the pot exceeds the limit and the valve core cannot be pushed to the second position by the pressure in the pot.

In one embodiment, the detection circuit includes a controller, the detection circuit converts the change in the inductance of the hollow inductance coil into an electric signal and inputs it to the controller, and the controller is configured to detect the electric signal and output a control signal in accordance with the detection result.

In one embodiment, the detection circuit includes the controller. When the position of the valve core changes, the inductance of the hollow inductance coil changes accordingly. The detection circuit converts the change in the inductance into an electric signal and input it to the controller for detection and analysis, so as to determine the position of the valve core. On basis of this, the controller can send a control signal to electrical devices connected to it in accordance with the detection and analysis result of the above electric signal, that is, the determination result of the position of the valve core, to control the electric devices to operate correspondingly.

In one embodiment, the float valve motion detection device further comprises a prompt device which is electrically connected to the controller for emitting a photoelectric and/or audible prompt under the control of the controller.

In one embodiment, the float valve motion detection device further comprises the prompt device. When the position of the valve core changes, the controller sends a control signal to the prompt device, so as to cause the prompt device to emit a corresponding photoelectric and/or audible prompt signal, cause the attention of the user and inform the user of whether it is safe to uncover at the current time, thereby preventing the user from uncovering when the pressure in the pot exceeds the safe range, which enhances safety of the product.

In one embodiment, the prompt device includes an indicator light and/or a buzzer and/or a display screen.

In one embodiment, the float valve further includes a valve seat fixedly mounted on the upper cover, the valve seat is provided with a mounting hole, and the valve core is slidably mounted in the mounting hole.

In one embodiment, the bottom of the valve core protrudes from a lower end of the mounting hole, and the bottom of the valve core is mounted with a gasket for sealing a gap between the valve core and the mounting hole when the valve core is at the second position.

An embodiment of the present disclosure provides a pot cover assembly having the float valve motion detection device provided by any of the embodiments of the present disclosure. Therefore, the pot cover assembly has all of the advantageous effects of the float valve motion detection device provided by any of the embodiments as described above.

The pot cover assembly provided by an embodiment of the present disclosure, for a pressure cooking appliance, comprises: an upper cover on which a mounting cavity is disposed, the top of the mounting cavity being provided with a through hole; the float valve motion detection device of any of claims 1-8, comprising a float valve, a hollow inductance coil and a detection circuit, and the hollow inductance coil is fixedly mounted in the mounting cavity, the float valve includes a valve core, the valve core is movably mounted in the mounting cavity, a first segment of the valve core extends into the center of the hollow inductance coil when the valve core is not lifted by the pressure in the pot, a second segment of the valve core extends into the center of the hollow inductance coil when the valve core is lifted by the pressure in the pot, and the magnetic resistance of the first segment and that of the second segment are unequal, and the detection circuit is electrically connected to the hollow inductance coil, and is configured to detect a change in the inductance of the hollow inductance coil, and determine the position of the valve core in accordance with the change in the inductance; and the top of the valve core protrudes from the upper cover through the through hole when the valve core is lifted by the pressure in the pot.

It should be noted that the first segment and the second segment of the valve core may be independent. That is, after the valve core is lifted, the portion (i.e., the first segment) originally located in the hollow inductance coil is completely disengaged from the coil, and the second segment of the valve core enters the coil. The first segment and the second segment of the valve core may also have the overlapping portion. That is, after the valve core is lifted, the first segment originally located in the hollow inductance coil is partially disengaged from the coil, and the remainder of the first segment is still in the coil, and the remainder of the first segment and the portion of the valve core newly entering into the coil constitute the second segment.

The solution changes the relative position of the valve core and the hollow inductance coil in the height direction. When the valve core is not lifted by the pressure in the pot, at least a portion of the valve core protrudes into the center of the hollow inductance coil, which reduces the mounting space required for the valve core and the hollow inductance coil in the height direction. Thus, the thickness of the upper cover can be reduced and the aesthetics of the product is improved while saving the usage amount of production materials of the upper cover, so as to reduce the production cost of the product. In addition, in the solution, a through hole is disposed at the top of the mounting cavity of the upper cover. When the valve core is lifted by the pressure in the pot, the top of the valve core extends through the through hole to the outside of the upper cover, and the user can directly view the valve core, in order to enable the user to easily know whether the valve core is in the lifted state in the case that the prompt such as photoelectric, audible prompt and the like, about safe uncovering of the product failed, thereby determining whether it is safe to uncover in the current state of the product. This can greatly improve safety of the product.

The working principle of the float valve motion detection device is as follows. When the valve core of the float valve is not lifted by the pressure in the pot, the first segment of the valve core protrudes into the center of the hollow inductance coil, and when the valve core is lifted by the pressure in the pot, the second segment of the valve core protrudes into the center of the hollow inductance coil. Since the magnetic resistance of the first segment and the second segment of the valve core are unequal, the inductance of the hollow inductance coil changes. The detection circuit determines whether the valve core is lifted by detecting the change in the inductance of the hollow inductance coil, thereby determining whether it is safe to uncover at the current time.

In accordance with an embodiment of the present disclosure, the volume of the first segment and the volume the second segment are unequal, and the permeability of the production material of the valve core and the permeability of the air are unequal.

In this solution, the valve core is made of materials having permeability unequal to that of air, and the whole valve core is integrally formed during production, which simplifies the production procedure of designing the valve core, and can improve the production efficiency of the product. The volume of the first segment and the volume of the second segment are unequal, so that the magnetic resistances of the first segment and the second segment are unequal, so as to ensure that the inductance of the hollow inductance coil changes after the valve core is lifted. Thus, the detection circuit can determine whether the valve core is lifted by means of the change in inductance of the hollow inductance coil, thereby determining whether it is safe to uncover at the current time.

In one embodiment, one of the first segment and the second segment is provided with a distinguishing portion that is outwardly convex or inwardly concave such that the volume the first segment and the volume of the second segment are unequal.

In one embodiment, one of the first segment and the second segment of the valve core is provided with protrusions or grooves, making the volume of the first segment and the volume of the second segment unequal y, so that the difficulty in the production and processing of the valve core is low.

In one embodiment, the first segment and the second segment are provided with a distinguishing portion that is outwardly convex or inwardly concave, respectively, and the volume of the distinguishing portion of the first segment and that of the distinguishing portion of the second segment are unequal, such that the volume of the first segment and the volume of the second segment are unequal.

In accordance with an embodiment of the present disclosure, the first segment or the second segment is provided with magnetically conductive materials, and the permeability of the magnetically conductive materials is unequal to the permeability of production materials of the valve core.

The magnetically conductive materials greatly affects the inductance of the hollow inductance coil. In this solution, the first or second segment of the valve core is provided with the magnetically conductive materials, so that when the position of the valve core changes, the inductance of the hollow inductance coil changes greatly, enabling the detection circuit to be easily detected, thereby improving the reliability of the float valve motion detection device.

In accordance with an embodiment of the present disclosure, the first segment and the second segment are provided with magnetically conductive materials, respectively, the permeability of the magnetically conductive materials is unequal to the permeability of production materials, and the volume of the magnetically conductive materials of the first segment is unequal to that of the magnetically conductive materials of the second segment.

An embodiment of the present disclosure provides a pressure cooking appliance, comprising: a pot body and the pot cover assembly provided by any of the embodiments of the disclosure invention. The detection circuit in the pot cover assembly may be wholly located on the upper cover, or may be partially located on the upper cover, and its remainder is located on the pot body.

The pressure cooking appliance provided by the embodiment of the present disclosure has the pot cover assembly provided by any of the embodiments of the present disclosure. Thus the pressure cooking appliance has all the advantageous effects of the pot cover assembly provided by any of the above embodiments, the details of which are not repeated herein.

In one embodiment, the pressure cooking appliance includes an electric pressure cooker, a pressure rice cooker and the like.

BRIEF DESCRIPTION OF THE DRAWINGS

The foregoing and/or additional embodiments of the present disclosure will become apparent and understandable from the following description of the embodiments in conjunction with the accompanying drawings.

Figure 1:
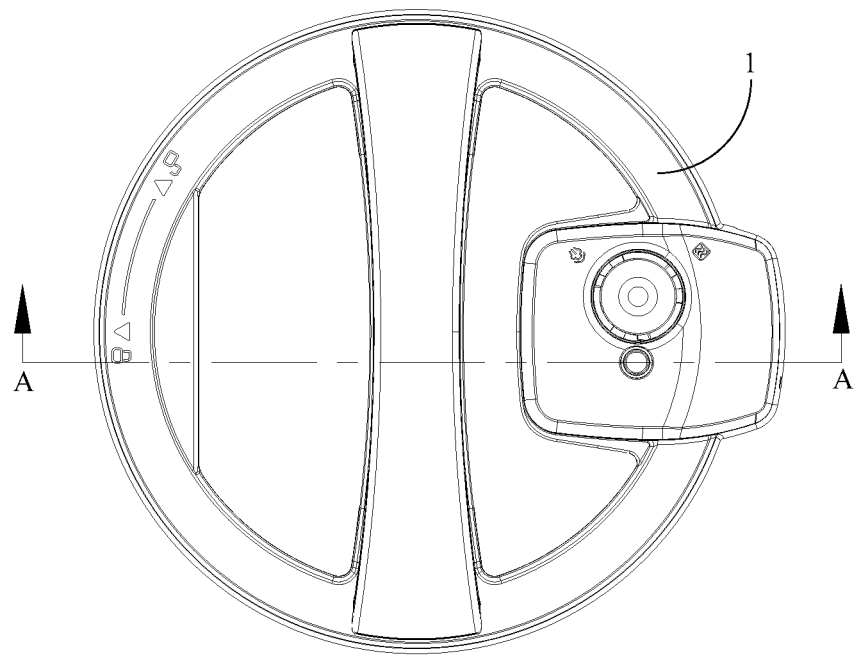
FIG. 1 shows a schematic structural view of the assembly of a float valve motion detection device and an upper cover according to an embodiment of the present disclosure.
Figure 2:
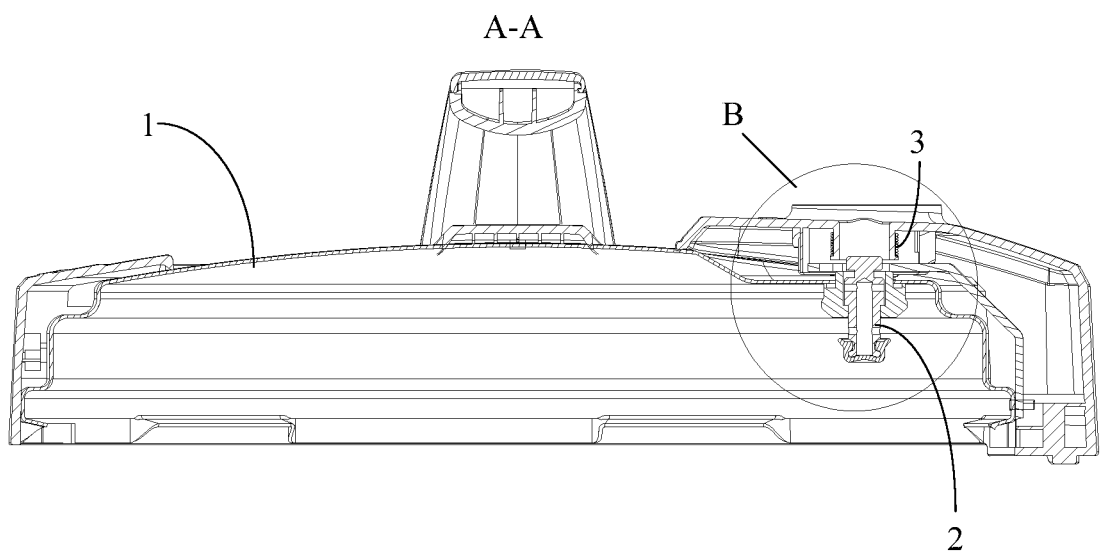
FIG. 2 is a schematic view of a cross-segmental structure of the float valve action detection device and the upper cover taken along the line A-A as shown in FIG. 1.
Figure 3:
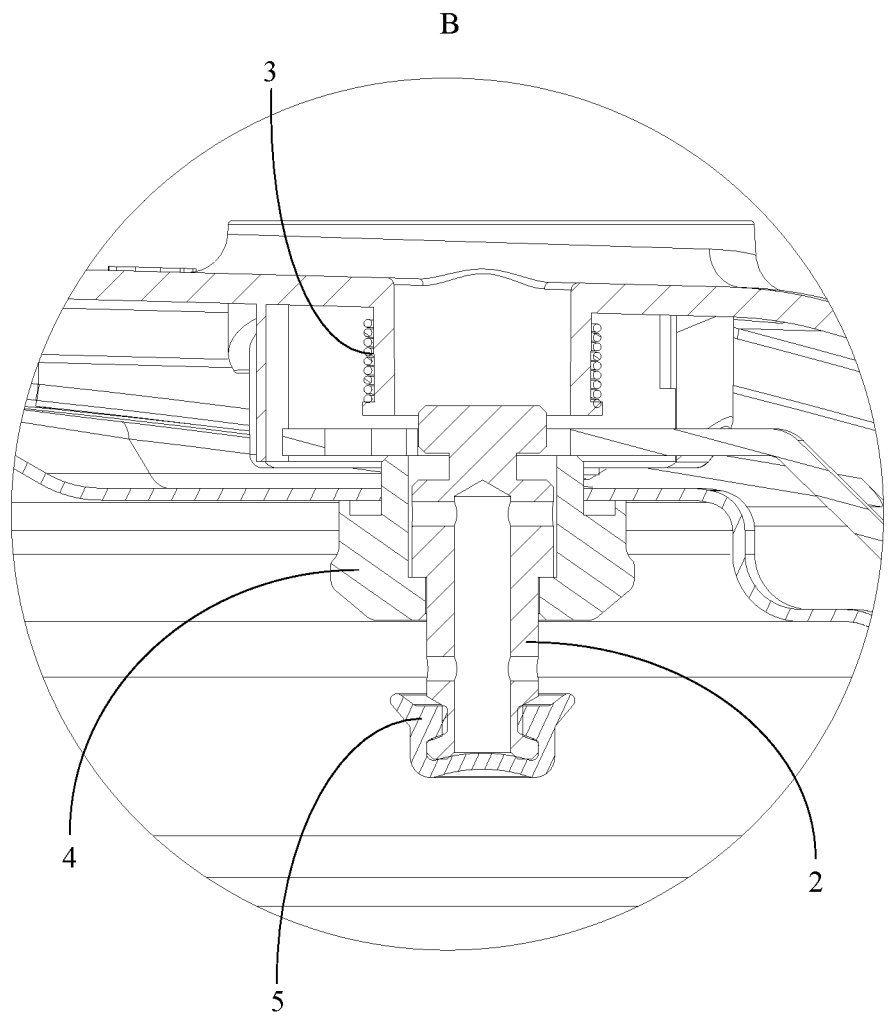
FIG. 3 is an enlarged schematic view of the structure of the portion B of FIG. 2.
Figure 4:
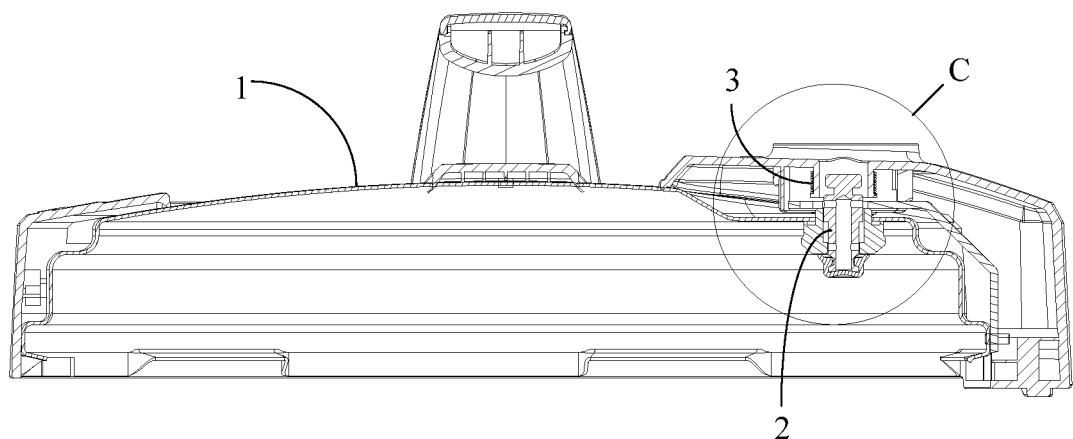
FIG. 4 is a schematic view showing the structure of the float valve motion detection device as shown in FIG. 2 in a state in which the valve core is in a lifted state.
Figure 5:
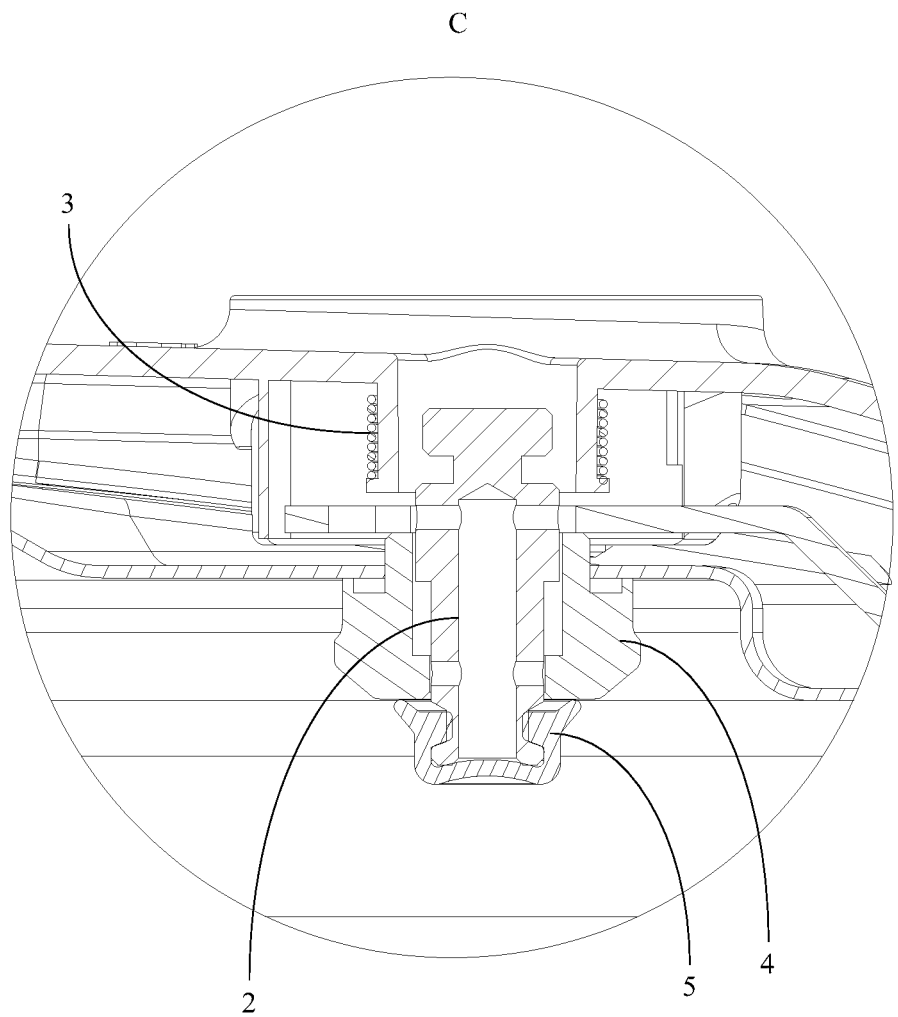
FIG. 5 is an enlarged schematic view of the structure of the portion C of FIG. 4.
Figure 6:
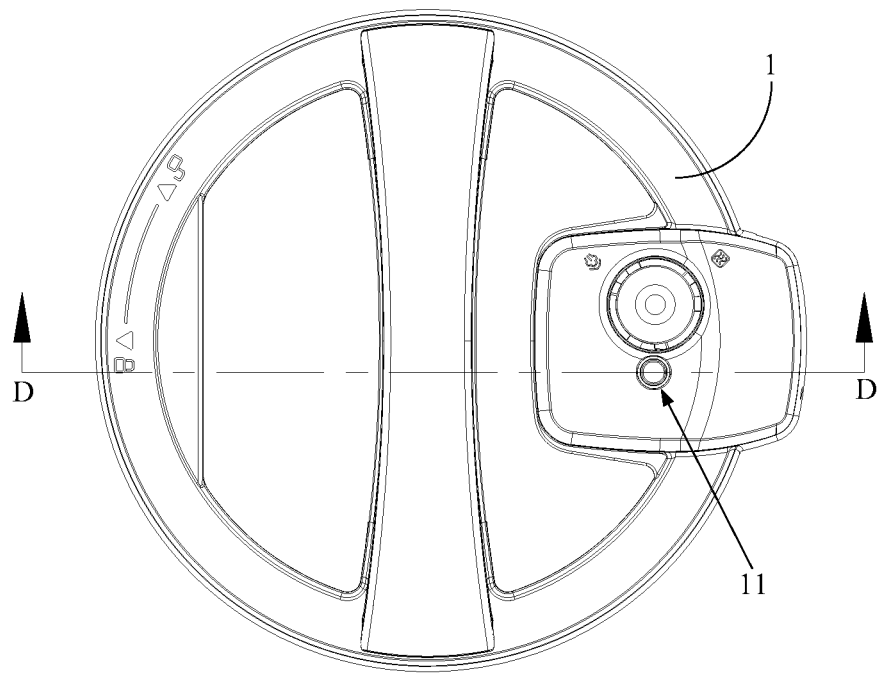
FIG. 6 is a schematic structural view of a pot cover assembly according to an embodiment of the present disclosure.
Figure 7:
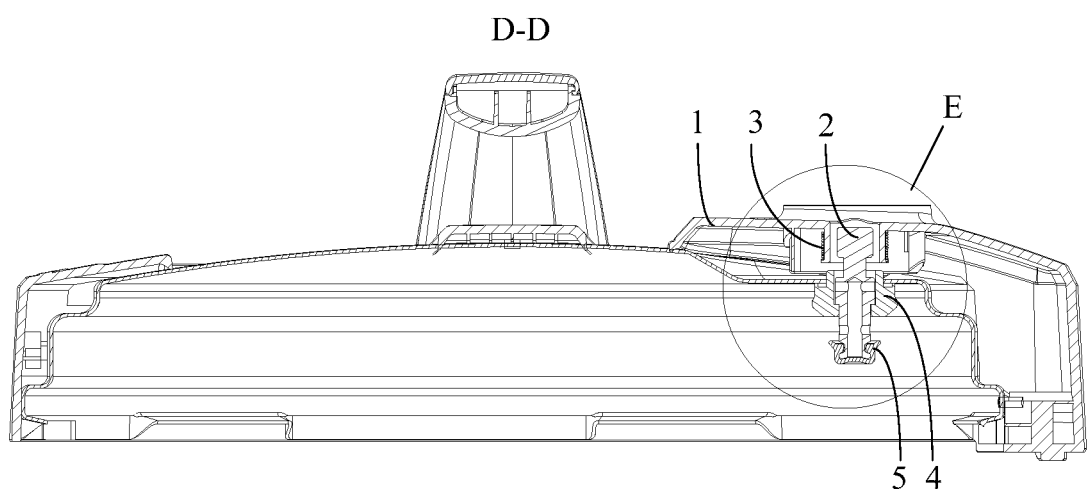
FIG. 7 is a schematic view of a cross-segmental structure of the pot cover assembly taken along the line D-D as shown in FIG. 6.
Figure 8:
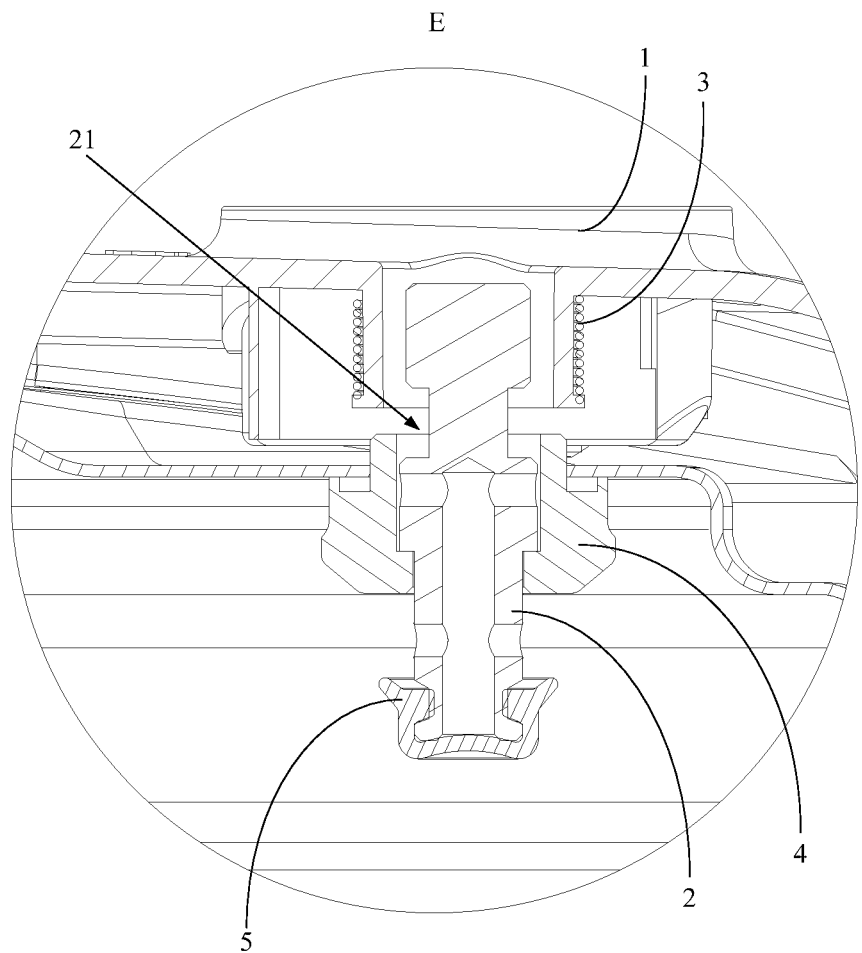
FIG. 8 is a schematic enlarged view of the structure of the portion E of FIG. 7.
Figure 9:
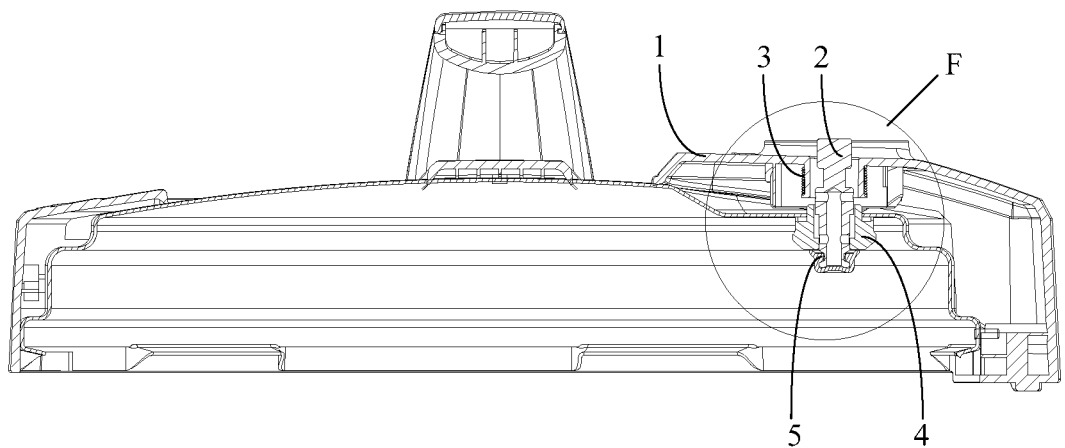
FIG. 9 is a schematic view showing the structure of the pot cover assembly shown in FIG. 7 in a state in which the valve core is in a lifted state.
Figure 10:
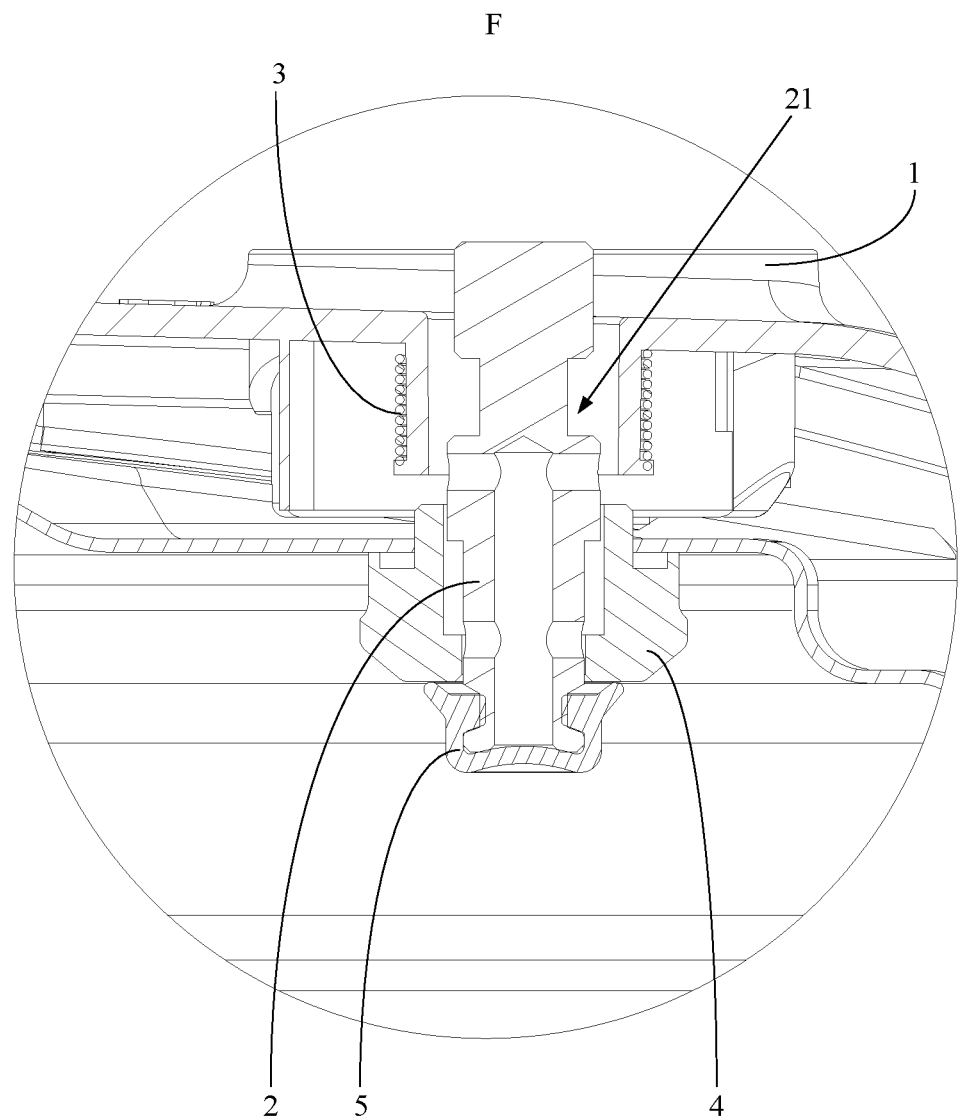
FIG. 10 is an enlarged schematic view showing the structure of the portion F of FIG. 9.
Figure 11:
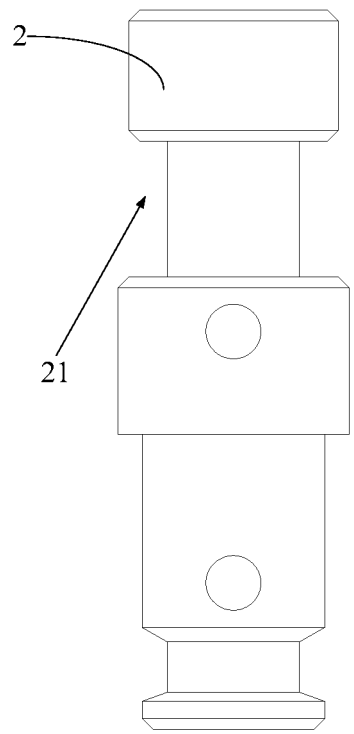
FIG. 11 is a schematic view of the structure of the valve core of FIG. 7.

In one embodiment, the correspondence between the reference numerals in FIG. 1 to FIG. 12 and the part names is:

1 an upper cover, 11 a through hole, 2 a valve core, 21 a groove, 3 a hollow inductance coil, 4 a valve seat, 5 a gasket.

DETAILED DESCRIPTION

The embodiments of the present disclosure can be understood more clearly, a further detailed description of the present disclosure which will be given below in combination with the accompanying drawings and embodiments. It should be noted that, in the absence of a conflict, the embodiments of the present application and the features in the embodiments can be combined with each other.

A lot of specific details are set forth in the following description so as to fully understand the present disclosure, but the present disclosure may also be implemented in other ways other than those described herein, and thus the protection scope of the present disclosure is not limited to the specific embodiments disclosed below.

An embodiment of the present disclosure provides a float valve motion detection device for a pressure cooking appliance, comprising: a float valve, a hollow inductance coil and a detection circuit. In the solution, a valve core of the float valve is made of materials having permeability unequal to that of air, and the valve core is movably mounted on an upper cover of the pressure cooking appliance. When the pressure in the pot of the pressure cooking appliance exceeds a safe range, the valve core is pushed by the pressure in the pot from a first position to a second position, and the volume of the valve core in the hollow inductance coil increases or decreases, which changes the inductance of the hollow inductance coil. The detection circuit determines the position of the valve core by means of detecting the change in the inductance of the hollow inductance coil so as to determine whether it is safe to uncover at the current time. Changing the structure of the valve core of the float valve and fabricating the valve core using materials having permeability unequal to that of air removes the magnetically conductive materials in the old solution from the valve core, which not only saves on production materials, but also omits the processing procedures for the magnetically conductive materials and the magnetically conductive material mounting part on the valve core as well as the assembling procedures for the magnetically conductive materials and the valve core, thereby reducing production cost and improving production efficiency. This enables enterprises to gain an advantage in industry competition.

First Embodiment

As shown in FIGS. 1-5, the float valve motion detection device comprises: a float valve, a hollow inductance coil 3 and a detection circuit. The float valve comprises a valve core 2 made of materials having permeability unequal to that of air, the valve core 2 is movably mounted on an upper cover 1 of the pressure cooking appliance, the valve core 2 can be pushed from a first position to a second position under pressure in a pot of the pressure cooking appliance. The hollow inductance coil 3 is fixedly mounted on the upper cover 1, the hollow inductance coil 3 is at least partially located above the valve core 2 when the valve core 2 is at the first position, and the volume of the valve core 2 in the hollow inductance coil 3 increases when the valve core 2 is pushed to the second position by the pressure in the pot. The detection circuit electrically connecting with the hollow inductance coil 3, for detecting a change in inductance of the hollow inductance coil 3, and determining the position of the valve core 2 according to the change in inductance.

In one embodiment, when the valve core 2 is at the first position, the hollow inductance coil 3 is at least partially located above the valve core 2, and when the valve core 2 is pushed by the pressure in the pot to the second position, the volume of the valve core 2 in the hollow inductance coil 3 increases. The permeability of materials of the valve core 2 is unequal to that of air, which decreases the inductance of the hollow inductance coil. When the detection circuit detects that the amount of decrease of the inductance of the hollow inductance coil 3 reaches the preset value, the valve core 2 is determined to be pushed by the pressure in the pot to the second position, thereby determining that the pressure in the pot exceeds the safety range and it is unsafe to uncover at the current time. After the pressure in the pot falls to the safe range, the valve core 2 automatically falls back to the first position, and the volume of the valve core 2 in the hollow inductance coil 3 is reduced, which increases the inductance of the hollow inductance coil 3. When the detection circuit detects that the amount of increase of the inductance of the hollow inductance coil 3 reaches the preset value, the valve core is determined to fall back to the first position, thereby determining that the pressure in the pot falls to the safe range and it is safe to uncover at the current time.

Second Embodiment

The float valve motion detection device comprises: a float valve, a hollow inductance coil and a detection circuit. The float valve comprises a valve core made of materials having permeability unequal to that of air, the valve core is movably mounted on an upper cover of the pressure cooking appliance, the valve core can be pushed from a first position to a second position under pressure in a pot of the pressure cooking appliance. The hollow inductance coil is fixedly mounted on the upper cover, the valve core is at least partially located in the hollow inductance coil when the valve core is at the first position, and the volume of the valve core in the hollow inductance coil decreases when the valve core is pushed to the second position by the pressure in the pot. The detection circuit is electrically connected with the hollow inductance coil, for detecting a change in inductance of the hollow inductance coil, and determining the position of the valve core according to the change in inductance.

In one embodiment, when the valve core is at the first position, the valve core is at least partially located in the hollow inductance coil, and when the valve core is pushed to the second position by the pressure in the pot, the portion of the valve core located at the center of the hollow inductance coil is wholly or partially disengaged from the hollow inductance coil, which decreases the volume of the valve core in the hollow inductance coil. Since the permeability of the materials of the valve core is less than that of air, the inductance of the hollow inductance coil increases. When the detection circuit detects that the amount of increase of the inductance of the hollow inductance coil reaches the preset value, the valve core is determined to be pushed to the second position by the pressure in the pot, thereby determining that the pressure in the pot exceeds the safe range and it is unsafe to uncover at the current time. After the pressure in the pot falls to the safe range, the valve core automatically falls back to the first position, and the volume of the valve core in the hollow inductance coil increases, which decreases the inductance of the hollow inductance coil. When the detection circuit detects that the amount of decrease of the inductance of the hollow inductance coil reaches the preset value, the valve core is determined to have fallen back to the first position, thereby determining that the pressure in the pot falls to the safe range and it is safe to uncover at the current time.

In any of the above embodiments, the valve core is made of aluminum.

The permeability of aluminum is less than that of air, and its density is small. The valve core 2 is made of aluminum as the production material, which can avoid the excessive weight of the valve core 2 and ensure that the weight of the parts meets the design requirements, so as to prevent the issue that the pressure in the pot exceeds the limit and the valve core 2 cannot be pushed to the second position by the pressure in the pot.

In any of the above embodiments, the detection circuit includes a controller, the detection circuit converts the change in the inductance of the hollow inductance coil 3 into an electric signal and inputs it to the controller, and the controller is configured to detect the electric signal and output a control signal according to the detection result.

In one embodiment, the detection circuit includes the controller. When the position of the valve core 2 changes, the inductance of the hollow inductance coil 3 changes accordingly. The detection circuit converts the change in the inductance into an electric signal and input it to the controller for detection and analysis, so as to determine the position of the valve core 2. On basis of this, the controller can send a control signal to electrical devices connected to it in accordance with the detection and analysis result of the above electric signal, that is, the determination result of the position of the valve core 2, to control the electric devices to operate correspondingly.

In any of the above embodiments, the float valve motion detection device further comprises a prompt device which is electrically connected to the controller for emitting a photoelectric signal and/or sound under the control of the controller.

In one embodiment, the float valve motion detection device further comprises the prompt device. When the position of the valve core 2 changes, the controller sends a control signal to the prompt device, so as to cause the prompt device to emit a corresponding photoelectric and/or audible prompt signal, cause the attention of the user and inform the user of whether it is safe to uncover at the current time, thereby preventing the user from uncovering when the pressure in the pot exceeds the safe range, which enhances safety of the product.

In one embodiment, the prompt device includes an indicator light and/or a buzzer and/or a display screen.

As shown in FIGS. 2-5, in any of the above embodiments, the float valve further includes a valve seat 4 fixedly mounted on the upper cover 1, the valve seat 4 is provided with a mounting hole, and the valve core 2 is slidably mounted in the mounting hole.

As shown in FIGS. 2-5, in any of the above embodiments, the bottom of the valve core 2 protrudes from a lower end of the mounting hole, and the bottom of the valve core 2 is mounted with a gasket 5 for sealing a gap between the valve core 2 and the mounting hole when the valve core 2 is at the second position.

As shown in FIGS. 6-10, an embodiment of the present disclosure provides a pot cover assembly for a pressure cooking appliance, which comprises an upper cover 1 and the float valve motion detection device of any of the embodiments of the present disclosure. A mounting cavity is disposed on the upper cover 1, and the top of the mounting cavity is provided with a through hole. The float valve motion detection device comprises a float valve, a hollow inductance coil 3 and a detection circuit. The hollow inductance coil 3 is fixedly mounted in the mounting cavity, the float valve includes a valve core 2, and the valve core 2 is movably mounted in the mounting cavity. A first segment of the valve core 2 extends into the center of the hollow inductance coil when the valve core is not lifted by the pressure in the pot, a second segment of the valve core 2 extends into the center of the hollow inductance coil 3 when the valve core 2 is lifted by the pressure in the pot, and the magnetic resistance of the first segment and that of the second segment are unequal. The detection circuit is electrically connected to the hollow inductance coil 3, and is configured to detect a change in the inductance of the hollow inductance coil 3, and determine the position of the valve core 2 in accordance with the change in the inductance. The top of the valve core 2 protrudes from the upper cover 1 through the through hole 11 when the valve core 2 is lifted by the pressure in the pot.

It should be noted that the first segment and the second segment of the valve core 2 may be independent. That is, after the valve core 2 is lifted, the portion (i.e., the first segment) originally located in the hollow inductance coil 3 is completely disengaged from the coil, and the second segment of the valve core 2 enters the coil. The first segment and the second segment of the valve core 2 may also have the overlapping portion. That is, after the valve core 2 is lifted, the first segment originally located in the hollow inductance coil 3 is partially disengaged from the coil, and the remainder of the first segment is still in the coil, and the remainder of the first segment and the portion of the valve core 2 newly entering into the coil constitute the second segment.

The solution changes the relative position of the valve core 2 and the hollow inductance coil 3 in the height direction. When the valve core 2 is not lifted by the pressure in the pot, at least a portion of the valve core 2 protrudes into the center of the hollow inductance coil 3, which reduces the mounting space required for the valve core 2 and the hollow inductance coil 3 in the height direction. Thus, the thickness of the upper cover 1 can be reduced and the aesthetics of the product is improved while saving the usage amount of production materials of the upper cover 1, so as to reduce the production cost of the product. In addition, in the solution, a through hole 11 is disposed at the top of the mounting cavity of the upper cover 1. When the valve core 2 is lifted by the pressure in the pot, the top of the valve core 2 extends through the through hole 11 to the outside of the upper cover 1, and the user can directly view the valve core 2, in order to enable the user to easily know whether the valve core 2 is in the lifted state in the case that the prompt such as photoelectric, audible prompt and the like for safe uncovering of the product failed, thereby determining whether it is safe to uncover the product in the current state. This can greatly improve safety of the product.

The working principle of the float valve motion detection device is as follows. When the valve core 2 of the float valve is not lifted by the pressure in the pot, the first segment of the valve core 2 protrudes into the center of the hollow inductance coil 3, and when the valve core 2 is lifted by the pressure in the pot, the second segment of the valve core 2 protrudes into the center of the hollow inductance coil 3. Since the magnetic resistance of the first segment and the second segment of the valve core 2 are unequal, the inductance of the hollow inductance coil 3 changes. The detection circuit determines whether the valve core 2 is lifted by detecting the change in the inductance of the hollow inductance coil 3, thereby determining whether it is safe to uncover at the current time.

The specific structure of the valve core 2 includes a variety of embodiments.

First Embodiment

As shown in FIGS. 6-12, the valve core 2 is made of materials having permeability unequal to that of air, and the volume of the first segment of the valve core 2 is unequal to that of the second segment.

In this solution, the valve core 2 is made of materials having permeability unequal to that of air, and the whole valve core 2 is integrally formed during production, which simplifies the production procedure of designing the valve core, and can improve the production efficiency of the product. The volume of the first segment and the volume of the second segment of the valve core 2 are unequal, so that the magnetic resistances of the first segment and the second segment are unequal, so as to ensure that the inductance of the hollow inductance coil 3 changes after the valve core 2 is lifted. Thus, the detection circuit can determine whether the valve core 2 is lifted by means of the change in inductance of the hollow inductance coil 3, thereby determining whether it is safe to uncover at the current time.

In one embodiment, as shown in FIGS. 6-11, the second segment of the valve core 2 is provided with a groove 21 so that the volume of the first segment is unequal to that of the second segment. When the valve core 2 is not lifted by the pressure in the pot, the groove 21 is located below the hollow inductance coil 3. When the valve core 2 is lifted by the pressure in the pot, the position of the valve core 2 is raised, and the groove 21 enters the hollow inductance coil 3, which reduces the volume of the valve core 2 in the hollow inductance coil 3 and changes the inductance of the hollow inductance coil 3. The detection circuit determines whether the valve core 2 is lifted by detecting the change in the inductance of the hollow inductance coil 3, thereby determining whether it is safe to uncover at the current time.

Figure 12:
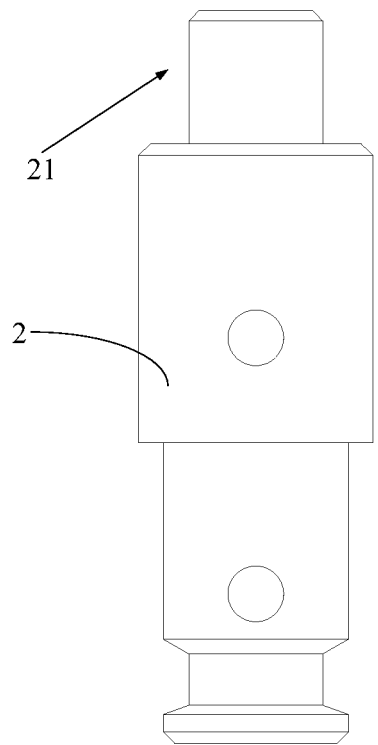
FIG. 12 is a schematic structural view of a valve core according to another embodiment of the disclosure.

In one embodiment, as shown in FIG. 12, the first segment of the valve core 2 is provided with a groove 21 so that the volume of the first segment is unequal to that of the second segment. When the valve core 2 is not lifted by the pressure in the pot, the groove 21 is located below the hollow inductance coil 3. When the valve core 2 is lifted by the pressure in the pot, the position of the valve core 2 is raised, and the groove 21 is disengaged from the hollow inductance coil 3, which increases the volume of the valve core 2 in the hollow inductance coil 3 and changes the inductance of the hollow inductance coil 3. The detection circuit determines whether the valve core 2 is lifted by detecting the change in the inductance of the hollow inductance coil 3, thereby determining whether it is safe to uncover at the current time.

In one embodiment, the first segment and the second segment of the valve core 2 may be provided with a distinguishing portion that is outwardly convex or inwardly concave, respectively, and the volume of the distinguishing portion of the first segment and that of the distinguishing portion of the second segment are unequal, such that the volume of the first segment and the volume of the second segment are unequal.

Second Embodiment

The first segment or the second segment is provided with magnetically conductive materials, and the permeability of the magnetically conductive materials is unequal to the permeability of production materials of the valve core.

The magnetically conductive materials greatly affects the inductance of the hollow inductance coil. In this solution, the first or second segment of the valve core is provided with the magnetically conductive materials, so that when the position of the valve core changes, the inductance of the hollow inductance coil changes greatly, enabling the detection circuit to be easily detected, thereby improving the reliability of the float valve motion detection device.

In one embodiment, the first segment and the second segment of the valve core may be provided with magnetically conductive materials, respectively, the permeability of the magnetically conductive materials is unequal to the permeability of production materials of the valve core, and the volume of the magnetically conductive materials of the first segment is unequal to that of the magnetically conductive materials of the second segment.

In any of the above embodiments, the valve core is made of aluminum.

The permeability of aluminum is less than that of air, the inductance of the hollow inductance coil changes after the valve core made of aluminum, and the density of aluminum is small. Choosing aluminum as the production material of the valve core can avoid the excessive weight of the valve core and ensure that the weight of the parts meets the design requirements, so as to prevent the issue that the pressure in the pot exceeds the limit and the valve core cannot be lifted.

In one embodiment, the detection circuit includes a controller, the detection circuit converts the change in the inductance of the hollow inductance coil into an electric signal and inputs it to the controller, and the controller is configured to detect the electric signal and output a control signal in accordance with the detection result.

In one embodiment, the detection circuit includes the controller. When the position of the valve core changes, the inductance of the hollow inductance coil changes accordingly. The detection circuit converts the change in the inductance into an electric signal and input it to the controller for detection and analysis, so as to determine whether the valve core is lifted. On basis of this, the controller can send a control signal to electrical devices connected to it in accordance with the detection and analysis result of the above electric signal, that is, the determination result as to whether the valve core is lifted, to control the electric devices to operate correspondingly.

In one embodiment, the float valve motion detection device further comprises a prompt device which is electrically connected to the controller for emitting a photoelectric and/or audible prompt under the control of the controller.

In one embodiment, the float valve motion detection device further comprises the prompt device. When the position of the valve core changes, the controller sends a control signal to the prompt device, so as to cause the prompt device to emit a corresponding photoelectric and/or audible prompt signal, cause the attention of the user and inform the user of whether it is safe to uncover at the current time, thereby preventing the user from uncovering when the pressure in the pot exceeds the safe range, which enhances safety of the product.

In one embodiment, the prompt device includes an indicator light and/or a buzzer and/or a display screen.

As shown in FIGS. 7-10, in any of the embodiments, the float valve further includes a valve seat 4 fixedly mounted on the upper cover 1, the valve seat 4 is provided with a mounting hole, and the valve core 2 is slidably mounted in the mounting hole.

In one embodiment, the bottom of the valve core 2 protrudes from a lower end of the mounting hole, and the bottom of the valve core 2 is mounted with a gasket 5 for sealing a gap between the valve core 2 and the mounting hole when the valve core 2 is at the second position.

An embodiment of the present disclosure provides a pressure cooking appliance, comprising: a pot body and the pot cover assembly provided by any of the embodiments of the disclosure. The detection circuit in the pot cover assembly may be wholly located on the upper cover, or may be partially located on the upper cover, and its remainder is located on the pot body.

The pressure cooking appliance provided by the embodiment of the present disclosure has the pot cover assembly provided by any of the embodiments of the present disclosure. Thus, the pressure cooking appliance has all the advantageous effects of the pot cover assembly provided by any of the above embodiments, the details of which are not repeated herein.

In one embodiment, the pressure cooking appliance includes an electric pressure cooker, a pressure rice cooker and the like.

Although the claims are included, the present disclosure may be also defined by the following clauses:

1. A float valve motion detection device for a pressure cooking appliance, comprising: a float valve, a hollow inductance coil and a detection circuit, the float valve comprising a valve core made of materials having permeability unequal to that of air, the valve core being movably mounted on an upper cover of the pressure cooking appliance, the valve core being pushed from a first position to a second position by the pressure in a pot of the pressure cooking appliance; the detection circuit being electrically connected with the hollow inductance coil, for detecting a change in inductance of the hollow inductance coil, and determining the position of the valve core in accordance with the change in inductance:

wherein the volume of the valve core in the hollow inductance coil when it is at the first position is less than or greater than the volume of the valve core in the hollow inductance coil when it is at the second position.

2. The float valve motion detection device of clause 1, wherein, the hollow inductance coil is fixedly mounted on the upper cover, the hollow inductance coil is at least partially located above the valve core when the valve core is at the first position, and the volume of the valve core in the hollow inductance coil increases when the valve core is pushed to the second position by the pressure in the pot.

3. The float valve motion detection device of clause 1, wherein, the hollow inductance coil is fixedly mounted on the upper cover, the valve core is at least partially located in the hollow inductance coil when the valve core is at the first position, and the volume of the valve core in the hollow inductor increases when the valve core is pushed to the second position by the pressure in the pot.

4. The float valve motion detection device of any of clauses 1-3, wherein, the valve core is made of aluminum.

5. The float valve motion detection device of any of clauses 1-3, wherein, the detection circuit includes a controller, the detection circuit converts the change in the inductance of the hollow inductance coil into an electric signal and inputs it to the controller, and the controller is configured to detect the electric signal and output a control signal according to the detection result.

6. The float valve motion detection device of clause 5, wherein, further comprising:

a prompt device which is electrically connected to the controller for emitting a photoelectric and/or audible prompt under the control of the controller.

7. The float valve motion detection device of any of clauses 1-3, wherein, the float valve further includes a valve seat fixedly mounted on the upper cover, the valve seat is provided with a mounting hole, and the valve core is slidably mounted in the mounting hole.

8. The float valve motion detection device of clause 7, wherein, the bottom of the valve core protrudes from a lower end of the mounting hole, and the bottom of the valve core is mounted with a gasket for sealing a gap between the valve core and the mounting hole when the valve core is at the second position.

9. A pressure cooking appliance, comprising an upper cover, a pot body and the float valve motion detection device of any of clauses 1-8.

10. The pressure cooking appliance of clause 9, the pressure cooking appliance is an electric pressure cooker or a pressure rice cooker 11. A pot cover assembly for a pressure cooking appliance, comprising:
an upper cover on which a mounting cavity is disposed, the top of the mounting cavity being provided with a through hole;
a float valve motion detection device, comprising a float valve, a hollow inductance coil and a detection circuit, wherein the hollow inductance coil is fixedly mounted in the mounting cavity, the float valve includes a valve core, the valve core is movably mounted in the mounting cavity, a first segment of the valve core extends into the center of the hollow inductance coil when the valve core is not lifted by the pressure in the pot, a second segment of the valve core extends into the center of the hollow inductance coil when the valve core is lifted by the pressure in the pot, and the magnetic resistance of the first segment and that of the second segment are unequal, wherein the detection circuit is electrically connected to the hollow inductance coil, and is configured to detect a change in the inductance of the hollow inductance coil, and determine the position of the valve core in accordance with the change in the inductance;
wherein the top of the valve core protrudes from the upper cover through the through hole when the valve core is lifted by the pressure in the pot.

12. The pot cover assembly of clause 11, wherein, the volume of the first segment and the volume the second segment are unequal, and the permeability of the production material of the valve core and the permeability of the air are unequal.

13. The pot cover assembly of clause 12, wherein, one of the first segment and the second segment is provided with a distinguishing portion that is outwardly convex or inwardly concave such that the volume the first segment and the volume of the second segment are unequal.

14. The pot cover assembly of clause 12, wherein, the first segment and the second segment are provided with a distinguishing portion that is outwardly convex or inwardly concave, respectively, and the volume of the distinguishing portion of the first segment and that of the distinguishing portion of the second segment are unequal, such that the volume of the first segment and the volume of the second segment are unequal.

15. The pot cover assembly of clause 11, wherein, the first segment or the second segment is provided with magnetically conductive materials, and the permeability of the magnetically conductive materials is unequal to the permeability of production materials of the valve core.

16. The pot cover assembly of clause 11, wherein, the first segment and the second segment are provided with magnetically conductive materials, respectively, the permeability of the magnetically conductive materials is unequal to the permeability of production materials, and the volume of the magnetically conductive materials on the first segment is unequal to that of the magnetically conductive materials on the second segment.

17. The pot cover assembly of any of clauses 11-16, wherein,
the valve core is made of aluminum.

18. The pot cover assembly of any of clauses 11-16, wherein, the detection circuit includes a controller, the detection circuit converts the change in the inductance of the hollow inductance coil into an electric signal and inputs it to the controller, and the controller is configured to detect the electric signal and output a control signal in accordance with the detection result.

19. The float valve motion detection device of clause 18, wherein, further comprising:
a prompt device which is electrically connected to the controller for emitting a photoelectric and/or audible prompt under the control of the controller.

20. A pressure cooking appliance, comprising a pot body and a pot cover assembly of any of clauses 11-19.

In the description of the specification, it should be understood that the orientations or positional relationships indicated by the terms "upper." "lower," "top," "bottom," "inside," "outside" and the like are orientations or positional relationships shown in the drawings, merely for facilitating to the description of the present disclosure and the simplification of the description. It is not intended to indicate or imply that the referred devices or units must have specific orientations, are constructed and operated in specific orientations, and therefore cannot be construed as limitation to the present disclosure.

In the description of the present specification, the description by the terms "one embodiment." "some embodiments," "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in any suitable manner in any one or more embodiments or examples.

What is claimed is:
1. A float valve motion detection device for a pressure cooking appliance, comprising:
a float valve, a hollow inductance coil and a detection circuit, the float valve comprising a valve core made of non-magnetically conductive materials having permeability unequal to that of air, the valve core being movably mounted on an upper cover of the pressure cooking appliance, the valve core being pushed from a first position to a second position under pressure in a pot of the pressure cooking appliance; the detection circuit being electrically connected with the hollow inductance coil for detecting a change of inductance of the hollow inductance coil and determining position of the valve core in accordance with the change of the inductance; wherein
at the first position, the hollow inductance coil is partially located above the valve core;
the valve core comprises a first segment and a second segment below the first segment, and magnetic resistance of the first segment and that of the second segment are unequal;
a top surface of the first segment of the valve core is positioned in the hollow inductance coil when the valve core is not lifted by the pressure in the pot, a top surface of the second segment of the valve core is positioned in the hollow inductance coil only when the valve core is lifted by the pressure in the pot; and
volume of the valve core in the hollow inductance coil when it is at the first position is less than or greater than the volume of the valve core in the hollow inductance coil when it is at the second position.

2. The float valve motion detection device of claim 1, wherein,
the hollow inductance coil is fixedly mounted on the upper cover, the hollow inductance coil is at least partially located above the valve core when the valve core is at the first position, and the volume of the valve core in the hollow inductance coil increases when the valve core is pushed to the second position by the pressure in the pot.

3. The float valve motion detection device of claim 1, wherein,
the hollow inductance coil is fixedly mounted on the upper cover, the valve core is at least partially located in the hollow inductance coil when the valve core is at the first position, and the volume of the valve core in the hollow inductor increases when the valve core is pushed to the second position by the pressure in the pot.

4. The float valve motion detection device of claim 1, wherein,
the valve core is made of aluminum.

5. The float valve motion detection device of claim 1, wherein,
the detection circuit includes a controller, the detection circuit converts the change in the inductance of the hollow inductance coil into an electric signal and inputs it to the controller, and the controller is configured to detect the electric signal and output a control signal in accordance with the detection result.

6. The float valve motion detection device of claim 5, wherein, further comprising:
a prompt device which is electrically connected to the controller for emitting a photoelectric and/or audible prompt under the control of the controller.

7. The float valve motion detection device of claim 1, wherein,
the float valve further includes a valve seat fixedly mounted on the upper cover, the valve seat is provided with a mounting hole, and the valve core is slidably mounted in the mounting hole.

8. The float valve motion detection device of claim 7, wherein,
the bottom of the valve core protrudes from a lower end of the mounting hole, and the bottom of the valve core is mounted with a gasket for sealing a gap between the valve core and the mounting hole when the valve core is at the second position.

9. A pot cover assembly for a pressure cooking appliance, comprising:
an upper cover on which a mounting cavity is disposed, the top of the mounting cavity being provided with a through hole; and
a float valve motion detection device, comprising a float valve, a hollow inductance coil and a detection circuit, wherein the hollow inductance coil is fixedly mounted in the mounting cavity, the float valve includes a valve core made of non-magnetically conductive materials having permeability unequal to that of air, the valve core is movably mounted in the mounting cavity; wherein
at the first position, the hollow inductance coil is partially located above the valve core;
the valve core comprises a first segment and a second segment below the first segment, and magnetic resistance of the first segment and that of the second segment are unequal;
a top surface of the first segment of the valve core is positioned in the hollow inductance coil when the valve core is not lifted by the pressure in the pot, a top surface of the second segment of the valve core is positioned in the hollow inductance coil only when the valve core is lifted by the pressure in the pot;
the detection circuit is electrically connected to the hollow inductance coil, and is configured to detect a change of the inductance of the hollow inductance coil and determine position of the valve core in accordance with the change of the inductance;
the top of the valve core protrudes from the upper cover through the through hole to become visible for an user of the pressure cooking appliance when the valve core is lifted by the pressure in the pot.

10. The pot cover assembly of claim 9, wherein,
the volume of the first segment and the volume the second segment are unequal.

11. The pot cover assembly of claim 10, wherein,
one of the first segment and the second segment is provided with a distinguishing portion that is outwardly convex or inwardly concave such that the volume the first segment and the volume of the second segment are unequal.

12. The pot cover assembly of claim 10, wherein,
the first segment and the second segment are provided with a distinguishing portion that is outwardly convex or inwardly concave, respectively, and the volume of the distinguishing portion of the first segment and that of the distinguishing portion of the second segment are unequal, such that the volume of the first segment and the volume of the second segment are unequal.

13. A pressure cooking appliance, comprising:
a pot body; and
a pot cover assembly for a pressure cooking appliance, comprising:
an upper cover on which a mounting cavity is disposed, the top of the mounting cavity being provided with a through hole; and
a float valve motion detection device, comprising a float valve, a hollow inductance coil and a detection circuit, wherein the hollow inductance coil is fixedly mounted in the mounting cavity, the float valve includes a valve core made of non-magnetically conductive materials having permeability unequal to that of air, the valve core is movably mounted in the mounting cavity; wherein
at the first position, the hollow inductance coil is partially located above the valve core;
the valve core comprises a first segment and a second segment below the first segment, and magnetic resistance of the first segment and that of the second segment are unequal;
a top surface of the first segment of the valve core is positioned in the hollow inductance coil when the valve core is not lifted by the pressure in the pot, a top surface of the second segment of the valve core is positioned in the hollow inductance coil only when the valve core is lifted by the pressure in the pot;
the detection circuit is electrically connected to the hollow inductance coil, and is configured to detect a change in the inductance of the hollow inductance coil and determine the position of the valve core in accordance with the change in the inductance;
the top of the valve core protrudes from the upper cover through the through hole to become visible for an user of the pressure cooking appliance when the valve core is lifted by the pressure in the pot.

14. The float valve motion detection device of claim 1, wherein both top surfaces of the first segment and the second segment are positioned in the hollow inductance coil when the valve core is lifted by the pressure in the pot.

15. The float valve motion detection device of claim 9, wherein both top surfaces of the first segment and the second segment are positioned in the hollow inductance coil when the valve core is lifted by the pressure in the pot.

16. The float valve motion detection device of claim 13, wherein both top surfaces of the first segment and the second segment are positioned in the hollow inductance coil when the valve core is lifted by the pressure in the pot.

* * * * *